United States Patent
Call et al.

(10) Patent No.: US 8,160,758 B2
(45) Date of Patent: Apr. 17, 2012

(54) METHODS AND SYSTEMS FOR RADAR AIDED AIRCRAFT POSITIONING FOR APPROACHES AND LANDINGS

(75) Inventors: Curtis J. Call, Stillwater, MN (US); David E. Hedin, Woodbury, MN (US); David C. Vacanti, Renton, WA (US)

(73) Assignee: Honeywell International Inc., Morristown, NJ (US)

(*) Notice: Subject to any disclaimer, the term of this patent is extended or adjusted under 35 U.S.C. 154(b) by 1405 days.

(21) Appl. No.: 11/419,595

(22) Filed: May 22, 2006

(65) Prior Publication Data
US 2010/0256840 A1 Oct. 7, 2010

(51) Int. Cl.
*G06F 19/00* (2011.01)
*G06G 7/70* (2006.01)

(52) U.S. Cl. .......... 701/16; 701/3; 701/4; 701/14; 701/223; 701/226; 701/301

(58) Field of Classification Search .......... 701/3, 4, 701/16, 14, 223, 226, 301; 342/26, 33, 64, 342/43, 158, 179, 197, 29, 59
See application file for complete search history.

(56) References Cited

U.S. PATENT DOCUMENTS

| | | | |
|---|---|---|---|
| 4,866,450 A * | 9/1989 | Chisholm | 342/410 |
| 5,361,212 A | 11/1994 | Class et al. | |
| 5,654,890 A * | 8/1997 | Nicosia et al. | 701/16 |
| 5,657,009 A * | 8/1997 | Gordon | 340/968 |
| 5,714,948 A * | 2/1998 | Farmakis et al. | 340/961 |
| 5,952,961 A * | 9/1999 | Denninger | 342/357.3 |
| 6,018,698 A * | 1/2000 | Nicosia et al. | 701/214 |
| 6,094,607 A | 7/2000 | Diesel | |
| 6,182,005 B1 | 1/2001 | Pilley et al. | |
| 6,219,594 B1 * | 4/2001 | Nicosia et al. | 701/16 |
| 6,311,108 B1 * | 10/2001 | Ammar et al. | 701/16 |
| 6,405,107 B1 * | 6/2002 | Derman | 701/3 |
| 6,430,480 B1 * | 8/2002 | Ammar et al. | 701/16 |
| 6,492,934 B1 * | 12/2002 | Hwang et al. | 342/33 |
| 6,512,976 B1 | 1/2003 | Sabatino et al. | |
| 6,529,820 B2 | 3/2003 | Tomescu | |
| 6,571,155 B2 * | 5/2003 | Carriker et al. | 701/3 |

(Continued)

FOREIGN PATENT DOCUMENTS
WO 0002009 1/2000

OTHER PUBLICATIONS

European Patent Office, "Office Action", Feb. 17, 2009, Published in: EP.

(Continued)

*Primary Examiner* — Khoi Tran
*Assistant Examiner* — Jorge Peche
(74) *Attorney, Agent, or Firm* — Fogg & Powers LLC

(57) ABSTRACT

A method for radar aided positioning of an air vehicle for approach and landing is described. The method includes integrating global navigation satellite system (GNSS) data and inertial data to calculate a position of the air vehicle, scanning the environment forward of the air vehicle with a radar, and accessing a database of terrain features and their radar signatures. The method further includes matching features in the radar scan data to the radar signatures in the database to determine an actual position of the air vehicle and synthesizing glide slope and localizer signals for the approach and landing based on the determined actual position.

20 Claims, 3 Drawing Sheets

U.S. PATENT DOCUMENTS

| | | | |
|---|---|---|---|
| 6,591,171 B1 * | 7/2003 | Ammar et al. | 701/16 |
| 6,639,541 B1 * | 10/2003 | Quintana et al. | 342/18 |
| 7,089,092 B1 | 8/2006 | Wood et al. | |
| 7,693,620 B2 * | 4/2010 | Dubeck et al. | 701/16 |
| 2002/0147542 A1 * | 10/2002 | Tomescu | 701/120 |
| 2004/0225432 A1 * | 11/2004 | Pilley et al. | 701/117 |
| 2005/0182530 A1 * | 8/2005 | Murphy | 701/16 |
| 2005/0246071 A1 | 11/2005 | Chamas et al. | |
| 2006/0025899 A1 | 2/2006 | Peckham et al. | |
| 2006/0214816 A1 * | 9/2006 | Schell | 340/961 |
| 2006/0271250 A1 * | 11/2006 | Dubeck et al. | 701/16 |

OTHER PUBLICATIONS

European Patent Office, "Office Action", Feb. 17, 2009, Published in: EP.

* cited by examiner

METHODS AND SYSTEMS FOR RADAR AIDED AIRCRAFT POSITIONING FOR APPROACHES AND LANDINGS

BACKGROUND OF THE INVENTION

This invention relates generally to aircraft approach and landing procedures, and more specifically to methods and systems for radar aided aircraft positioning for approaches and landings.

Conventional instrument landing systems (ILS) utilize received localizer and glide slope transmissions to help guide an aircraft to properly approach an aircraft landing area, for example, a runway of an airport. The localizer signal provides azimuth, or lateral, information to be received by the ILS for use in guiding the aircraft to the centerline of the runway. The localizer signal includes radial information for a single course; the runway heading. The glide slope signal is the signal that provides vertical guidance to the aircraft during an ILS approach. A standard glide-slope path is 3° downhill to the approach-end of the runway.

A decision height for an ILS approach is a point on the glide slope where a decision must be made to either continue the landing or execute a missed approach. In part, ILS systems have been categorized as follows: Category I ILS procedures have decision heights of not less than 200 feet and visibility minima not less than 800 m (one-half mile), Category II ILS procedures have decision heights of not less than 100 feet and visibility minima not less than 400 m (one-quarter mile), and one embodiment of Category III ILS procedures have decision heights of not less than 50 feet and visibility minima not less than 200 m (one-eighth mile). Other Category III ILS procedures include a zero decision height. Category III ILS are subcategorized as IIIa, IIIb, and IIIc based on varying visibilities and decision heights. Categorization of ILS systems are based in part on the quality of the radio signals being transmitted.

As can be deduced from the above, the better the quality of the ILS signals, the higher the categorization with the best being Category IIIc and the worst being Category I. For a pilot to be able to make an approach to a runway in bad weather, the weather has to be at or above certain conditions depending on the category of the ILS. If the weather is below the categorization of the ILS, the pilot has to revert to a holding pattern hoping that the weather improves to the capability of the ILS or divert to land elsewhere. No approach can be made to airports where the environments is below the ILS categorization.

Not all runway ends support Category III landings. For a variety of reasons, ILS systems certified to Category III or even Category II supporting certain aircraft approaches are unfeasible or impractical.

BRIEF SUMMARY OF THE INVENTION

In one aspect, a method for radar aided positioning of an air vehicle for approach and landing is provided. The method comprises integrating Global Navigation Satellite System (GNSS) data and inertial data to calculate a position of the air vehicle, and scanning the environment forward of the air vehicle with a radar. The method also comprises accessing a database of terrain features and their radar signatures, matching features in the radar scan data to the radar signatures in the database to determine an actual position of the air vehicle, and synthesizing glide slope and localizer signals for the approach and landing based on the determined actual position.

In another aspect, an approach and landing system for an air vehicle is provided. The approach and landing system comprises an inertial data source configured to provide a position of the air vehicle, a radar system configured to scan the environment forward of the air vehicle, a database of terrain features including a location for each terrain feature stored in the database, and a processing device. The processing device is programmed to match terrain features from a radar scan of the forward environment with terrain features in the database to monitor and refine the position of the air vehicle received from the inertial data source.

DETAILED DESCRIPTION OF THE INVENTION

The herein described methods and systems synthesize glide slope and azimuth (localizer) data equivalent to that of a category III instrument landing system by using a radar system to validate, refine the accuracy of, and ensure the integrity of the aircraft positioning data provided by GPS and inertial reference systems.

Figure 1:
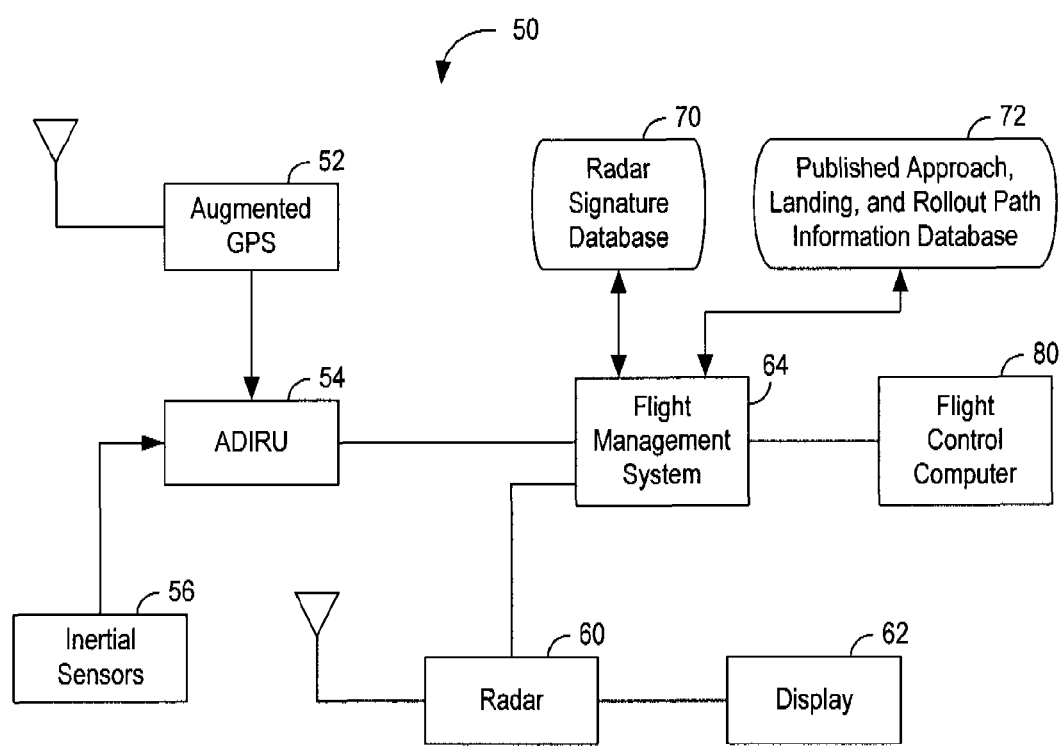
FIG. 1 is a block diagram of a system incorporating a radar that monitors integrity of GPS and inertial system position determinations.

FIG. 1 is a block diagram of a system 50 which utilizes radar data for approach and landing of an air vehicle. System 50 includes a Global Navigation Satellite System (GNSS) receiver 52 providing positioning and timing data to an air data inertial reference unit (ADIRU) 54. ADIRU 54 receives data from one or more inertial sensors 56, for example, accelerometers and gyroscopes enabling ADIRU 54 to estimate a position of the vehicle in which it is installed.

In one embodiment, GNSS receiver 52 is augmented with one or more of a space based augmentation system (SBAS) and a ground based augmentation system (GBAS), as further described below. GNSS, of which the global positioning system (GPS) is one example, is a satellite-based navigation system made up of a network of satellites placed into orbit. GNSSs work anywhere and in any weather conditions. The satellites circle the earth in a very precise orbit and transmit signal information to earth. The GNSS receiver 52 compares the time a signal was transmitted by a satellite with the time it was received. The time difference tells the GNSS receiver how far it is from the satellite. Using time difference data from several satellites, the receiver is capable of determining it's position. GNSS receivers (e.g., GNSS receiver 52) take the information received from the satellites and use triangulation to calculate an exact location of the receiver.

However, there are sources of inaccuracy when utilizing GNSS to determine a position. The satellite signal slows as it passes through the ionosphere and troposphere, though the GNSS is configured to calculate an average amount of delay to partially correct for this type of error. Multipath GNSS signals occur when the GNSS signal is reflected off objects before it reaches the receiver, increasing the travel time of the signal. A clock of the GNSS receiver is not as accurate as the atomic clocks onboard the GNSS satellites. Ephemeris errors are inaccuracies in the satellite's reported location. The number of satellites from which signals are being received also has an impact on the accuracy of the reported position. The more satellites a GNSS receiver can receive signals from, the better the accuracy in the reported position.

Satellite based augmentation systems (SBASs), of which the wide area augmentation system (WAAS) is one example, include a number of dispersed ground reference stations that monitor GNSS satellite data. In one embodiment, a smaller number of master stations collect data from the reference stations and create a GNSS correction message. The correction message provides adjustment data for GNSS satellite orbit and clock drift in addition to signal delays caused by the atmosphere and ionosphere. The correction message from each master station is broadcast through one or more geostationary satellites which are fixed in position over the equator. The correction message is in a format that is compatible with basic GNSS signal structure, therefore, any SBAS-enabled GNSS receiver is capable of receiving and utilizing the correction message.

Ground based augmentation systems (GBASs), of which local area augmentation system (LAAS) is one example, are based on a single GNSS reference station facility located on the property of the airport being serviced. This facility has three or more (redundant) reference receivers that independently measure GNSS satellite pseudorange and carrier phase and generate differential carrier-smoothed-code corrections that are eventually broadcast to a user (e.g., the aircraft attempting to land). The corrections typically include safety and approach-geometry information which allows users within forty-five kilometers of the GBAS ground station to perform GNSS-based position fixes with 0.5-meter (95%) accuracy and to perform all civil flight operations up to non-precision approach.

Still referring to FIG. 1, system 50 includes a radar system 60 which is configured to output radar scan data to a display 62 which displays the radar scan data as an image, for example, for viewing by a pilot or navigator. Radar scan data as well as position data as determined by ADIRU 54 is output to a flight management system 64, in one embodiment. As further described below, system 50 includes a radar signature database 70 and a database 72 of information relating to approach, landing, and rollout information to be utilized in the landing of air vehicles. Databases 70 and 72 are configured, in the embodiment illustrated, to provide data to flight management system 64. Flight management system 64, as further described, is programmed to utilize data from ADIRU 54, data from radar 60 and data from databases 70 and 72 to synthesize glide slope and localizer signals to assist in the approach and landing of aircraft. In one embodiment, these signals are utilized by flight control computer 80 to adjust the flight path of the air vehicle.

Figure 2:
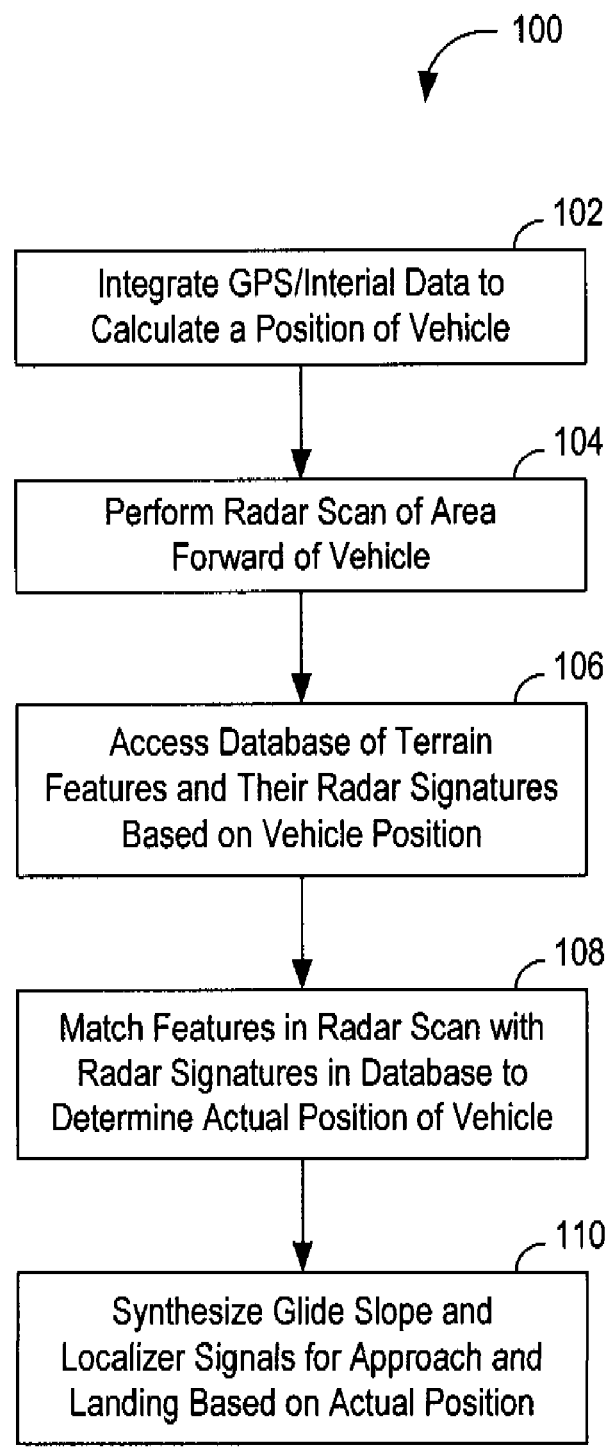
FIG. 2 is a flowchart illustrating a method for radar aided positioning of an air vehicle for approach and landing.

FIG. 2 is a flowchart 100 illustrating a method for radar aided positioning of an air vehicle for approach and landing. The method includes integrating 102 GNSS data and inertial data to calculate a position of the air vehicle, scanning 104 the environment forward of the vehicle with a radar, producing a scan of the terrain and airport environment forward of the air vehicle. A database of terrain features and their radar signatures are accessed 106 based on the calculated position of the air vehicle. Features in the radar scan data are matched 108 to the radar signatures in the database to determine an actual position of the air vehicle, and glide slope and localizer signals are synthesized 110 for the approach and landing based on the determined actual position. As described above with respect to FIG. 1, in one embodiment, GNSS data is combined with at least one of SBAS data and GBAS data.

To match the features in the radar scan data to the radar signatures in the database, at least one of image correlation, edge detection, and scene matching algorithms to recognize reference points are utilized. Reference points are selected which may include objects that have radar signatures and geolocations whose positions can be precisely measured, and flight management system 64 utilizes the reference point measurements from the radar 60 to validate the integrated GNSS data and inertial data as to the position of the air vehicle. At least a portion of the reference points are three dimensional geolocations. In a specific embodiment, data from radar 60 is also overlaid an a radar image of the approach and landing area on a electronic horizontal situational display (e.g., display 62).

To synthesize the glide slope and localizer signals, in one embodiment, flight management system 64 accesses published approach, landing, and rollout path information for the approach and landing area in database 72 and generates glide slope and localizer error signals that are proportional to the amount of deviation between the determined actual position of the aircraft and aircraft positions as defined in the approach, landing, and rollout path information. These error signals are utilized by flight control computer 80 to adjust a flight path of the air vehicle.

By matching features in the radar image to the radar signatures in database 70 enables determining of the distance between the air vehicle and at least one of the features in the radar image, allowing determination of an actual position of the air vehicle. Devices that might typically be included within database 70 include radar signatures of one or more of runway edges, intersections of runways and taxiways, runway of approach area lighting fixtures, radar corner reflectors.

Figure 3:
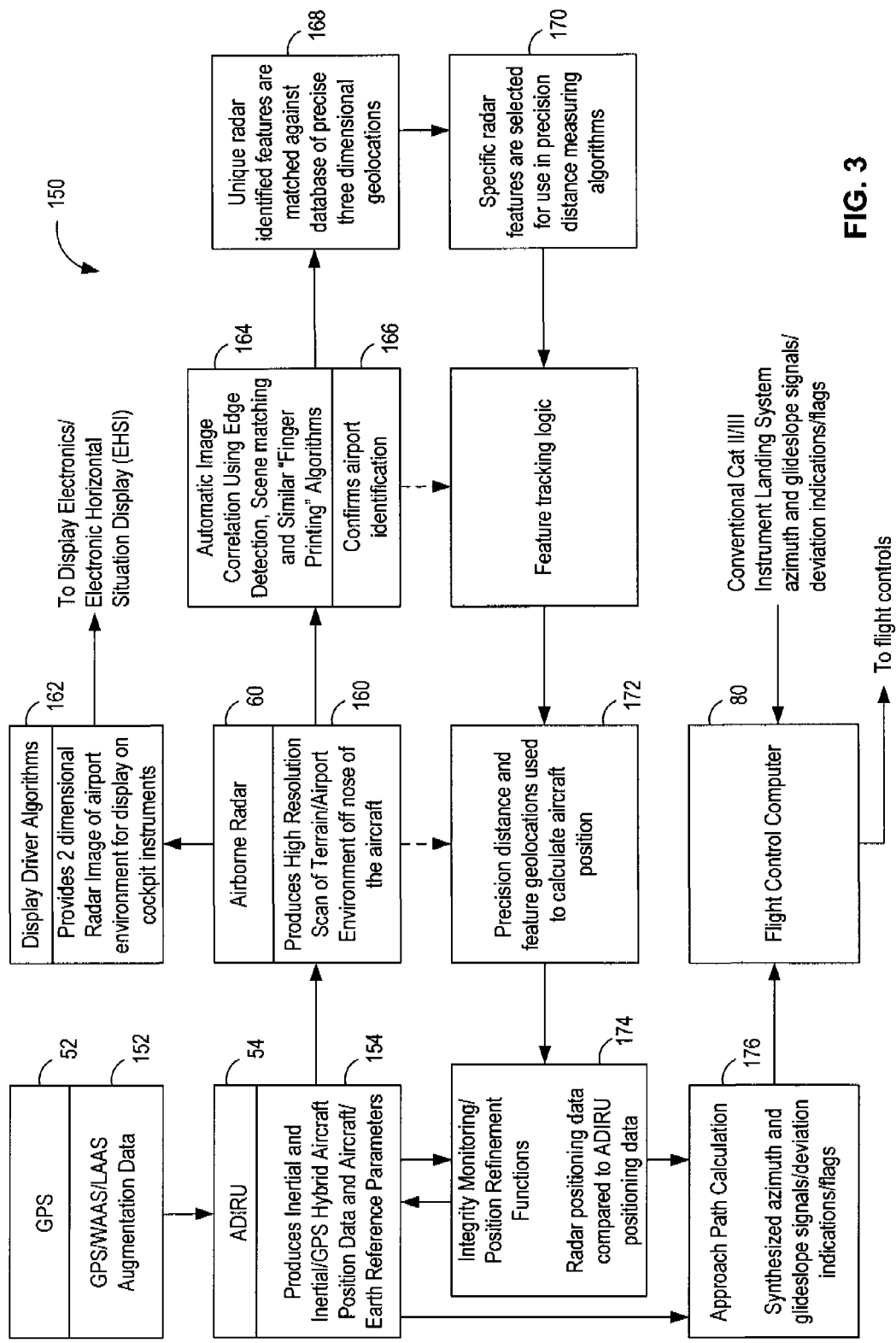
FIG. 3 is a data flow diagram for the system of FIG. 1 and method of FIG. 2.

FIG. 3 is a data flow diagram 150 further illustrating operation of the system of FIG. 1. As described, in one embodiment, air data inertial reference unit (ADIRU) 54 produces inertial position data which is enhanced with external GNSS measurements. More specifically, ADIRU 54 receives augmented GNSS data 152 as the GNSS references, in various embodiments, are enhanced by one or more of SBAS data and GBAS data. In receiving the augmented data 152, ADIRU 54 is enabled to combine augmented GNSS data 152 with the inertial data based on sensor data, for example, gyroscope and accelerometer data, to produce inertial/GNSS hybrid data and vehicle/earth reference parameters 154.

Airborne radar system 60 receives the inertial/GNSS hybrid data and vehicle/earth reference parameters 154 from ADIRU 54. Radar 60 produces a high resolution scan 160 of the terrain/airport environment off the nose of the air vehicle. The high resolution scan 160 has at least two functions. In one function, the data from the high resolution scan 160 is provided to a set of display driver algorithms 162 to provide a two dimensional image of the terrain/airport environment for display on one or more cockpit instruments, such as display 62, shown in FIG. 1. An example of such a display, as illustrated in FIG. 3 is an electronic horizontal situation display.

In a second function, the data from the high resolution scan 160 is integrated with a database of airport radar signatures 164 having radar signature features stored within that have sufficient detail to allow the implementation of automatic image correlation using edge detection, scene matching or similar "fingerprinting" techniques. One utilization of this second function is to confirm identification of the airport 166. Additionally, by matching unique features 168 in the radar scan data against these features in the database of airport radar signatures 164 (e.g., precise three dimensional locations of features exhibiting a specific radar signature, sometime referred to as reference points) a location of the air vehicle can be determined. Specific radar features are then selected for use in distance measuring algorithms 170. Distance to the items providing the specific radar features are then used to calculate a position 172 of the air vehicle. In this embodiment, pattern matching techniques ensure the recognition of these unique reference points, which are then used in the precision geolocation algorithms to determine air vehicle position in order to validate the inertial reference positioning data as radar based position data is compared 174 to ADIRU position data.

System 50 (shown in FIG. 1) utilizes published instrument approach procedures for each airport and runway which system 50 utilizes to perform approach path calculations 176 used for landing. In one embodiment, these instrument approach procedures are an extension of current airport and runway databases that incorporated in known flight management computer systems. With regard to system 50 and data flow diagram 150, published approach, landing and rollout path information is fed from flight management systems to flight control computer 80. System 50 is then able to calculate and monitor the approach path 176 being flown and generate error signals, specifically synthesized glide slope and localizer error signals that are proportional to the amount of deviation from a defined path for landing of the air vehicle. These synthesized error signals mimic those glide slope and localizer signals provided by a conventional ILS and are used by flight control computer 80 to adjust the air vehicle flight controls to reduce the synthesized glide slope and localizer error signals, which is an indication that the air vehicle is on the desired approach path to the airport and/or airport runway.

As described above, to provide confidence in the reliability and accuracy of using radar images to monitor and refine inertial system based position determinations, the radar image of the landing runway and surrounding airport environment is available for display as an overlay on the cockpit electronic horizontal situational or similar display.

System 50, as described above, is a system that incorporates a process of using an airborne radar based sensor system to identify unique airport features and their radar signatures, and use the identified features to measure distances between the aircraft sensor (radar) and the three dimensional geolocations of the identified airport features. These identified features include one or more of runway edges, intersections of runways and taxiways, runway or approach lighting fixtures, radar corner reflectors or similar objects located such that their unique signatures and geolocations can be measured with sufficient precision to refine and validate the accuracy and integrity of the inertial reference or GNSS/inertial reference hybrid positioning data calculated by the inertial reference systems, for example, ADIRU 54 receiving GNSS data that has been enhanced by SBAS or GBAS.

To perform such a process, the airborne radar system accesses an integrated database of airport radar signature features that are sufficiently distinct to allow implementation of automatic image correlation using edge detection, scene matching or similar "fingerprinting" techniques. The pattern matching techniques would serve to ensure the recognition of unique reference points for the use in the precision geolocation algorithms needed for validation of the inertial reference positioning data.

In summary, system 50 and the process of using radar data to monitor and verify data from inertial sensor systems to aid in approach and landing does not require the use of the ground based localizer, glide slope, or distance measuring equipment (DME) radio transmission systems of a conventional ILS. Elimination of the need for these radio transmission systems would overcome the primary obstacle responsible for causing conventional Cat II/III ILS installations to be deemed impractical or unfeasible. System 50 and the associated databases above described are flexible enough to synthesize glide path data to provide for the flexibility of curved approach path guidance.

While the invention has been described in terms of various specific embodiments, those skilled in the art will recognize that the invention can be practiced with modification within the spirit and scope of the claims.

What is claimed is:

1. A method for radar aided positioning of an air vehicle for approach and landing, said method comprising:
   integrating global navigation satellite system (GNSS) data and inertial data to calculate a position of the air vehicle;
   scanning the environment forward of the air vehicle with a radar;
   accessing a database of terrain features and their radar signatures;
   matching features in the radar scan data to the radar signatures in the database to determine an actual position of the air vehicle; and
   synthesizing glide slope and localizer signals for the approach and landing based on the determined actual position.

2. A method according to claim 1 further comprising augmenting the GNSS data with at least one of satellite based augmentation system (SBAS) and ground based augmentation system (GBAS) data.

3. A method according to claim 1 wherein scanning the environment forward of the vehicle with a radar comprises producing a scan of the terrain and airport environment forward of the air vehicle.

4. A method according to claim 1 wherein matching features in the radar scan data to the radar signatures in the database comprises utilizing at least one of image correlation, edge detection, and scene matching algorithms to recognize reference points.

5. A method according to claim 4 further comprising:
   selecting as reference points objects having radar signatures and geolocations whose positions can be precisely measured; and
   utilizing reference point measurements to validate the integrated GPS data and inertial data.

6. A method according to claim 4 wherein at least a portion of the reference point comprise three dimensional geolocations.

7. A method according to claim 1 wherein synthesizing glide slope and localizer signals comprises:
   accessing published approach, landing, and rollout path information for the approach and landing area; and
   generating glide slope and localizer error signals proportional to the amount of deviation between the determined actual position of the aircraft and an aircraft position defined in the approach, landing, and rollout path information.

8. A method according to claim 7 further comprising utilizing the error signals to adjust a flight path of the air vehicle.

9. A method according to claim 1 further comprising overlaying the radar image of the approach and landing area on a electronic horizontal display.

10. A method according to claim 1 matching features in the radar image to the radar signatures in the database comprises determining a distance between the air vehicle and at least one of the features in the radar image to determine an actual position of the air vehicle.

11. A method according to claim 1 wherein the radar signatures in the database include one or more of runway edges, intersections of runways and taxiways, runway of approach area lighting fixtures, and radar corner reflectors.

12. An approach and landing system for an air vehicle comprising:
   an inertial data source configured to provide a position of the air vehicle;
   a radar system configured to scan the environment forward of the air vehicle;
   a database of terrain features including a location for each terrain feature stored in said database; and
   a processing device, said processing device programmed to match terrain features from a radar scan of the forward environment with terrain features in said database to monitor and refine the position of the air vehicle received from said inertial data source, said processing device is programmed to synthesize at least one of a glide slope signal and a localizer signal for the approach and landing based on the refined air vehicle position.

13. An approach and landing system according to claim 12 wherein said inertial data source comprises GNSS data augmented with data from at least one of a satellite based augmentation system (e.g., FAA's WAAS) or a ground based augmentation system (e.g., FAA's LAAS).

14. An approach and landing system according to claim 13 wherein the satellite based augmentation system comprises a wide area augmentation system and the ground based augmentation system comprises a local area augmentation system.

15. An approach and landing system according to claim 12 wherein said processing device is programmed to match features within scan data received from said radar to features within said database utilizing at least one of image correlation, edge detection, and scene matching algorithms.

16. An approach and landing system according to claim 12 further comprising a database of approach, landing, and rollout path information for approach and landing areas, wherein said processing device is configured to generate at least one of glide slope error signals and localizer error signals proportional to the amount of deviation between the position of the aircraft and an aircraft position defined in the approach, landing, and rollout path information.

17. An approach and landing system according to claim 16 further comprising a flight control computer configured to utilize the at least one of glide slope error signals and localizer error signals to adjust a flight path of the air vehicle.

18. An approach and landing system according to claim 12 further comprising a display, said system configured to utilize data from said radar system to overlay a radar image of the approach and landing area on said display.

19. An approach and landing system according to claim 12 wherein to refine a position of the air vehicle, said processing device is configured to determine a distance between the air vehicle and one of the terrain features in the radar image to determine an actual position of the air vehicle.

20. An approach and landing system according to claim 12 wherein terrain features in said database comprise at least one of runway edges, intersections of runways and taxiways, runway of approach area lighting fixtures, and radar corner reflectors.

* * * * *